United States Patent
Dilyard et al.

(10) Patent No.: US 8,695,151 B2
(45) Date of Patent: Apr. 15, 2014

(54) COVERS FOR PAINT ROLLERS

(75) Inventors: Ricky L. Dilyard, Smithville, OH (US); Gary L. Leisure, Wooster, OH (US)

(73) Assignee: Wooster Brush Company, Wooster, OH (US)

( * ) Notice: Subject to any disclaimer, the term of this patent is extended or adjusted under 35 U.S.C. 154(b) by 948 days.

(21) Appl. No.: 12/135,707

(22) Filed: Jun. 9, 2008

(65) Prior Publication Data

US 2008/0242524 A1   Oct. 2, 2008

Related U.S. Application Data

(63) Continuation-in-part of application No. 11/151,166, filed on Jun. 10, 2005.

(60) Provisional application No. 60/639,830, filed on Dec. 28, 2004.

(51) Int. Cl.
    *B05C 1/08*    (2006.01)

(52) U.S. Cl.
    USPC ............................. 15/230; 15/230.11; 492/48

(58) Field of Classification Search
    USPC ................. 15/230, 230.11, 207.2; 492/48
    See application file for complete search history.

(56) References Cited

U.S. PATENT DOCUMENTS

| | | | | |
|---|---|---|---|---|
| 2,411,842 | A | * | 12/1946 | Adams .............................. 15/27 |
| 4,466,151 | A | * | 8/1984 | Barch et al. ................. 15/229.13 |
| 5,146,646 | A | * | 9/1992 | Langford et al. ............ 15/210.1 |
| 6,412,139 | B1 | * | 7/2002 | Weihrauch ................... 15/159.1 |
| 6,675,429 | B2 | | 1/2004 | Carter et al. |

* cited by examiner

*Primary Examiner* — Laura C Guidotti
(74) *Attorney, Agent, or Firm* — McNees Wallace & Nurick LLC

(57) ABSTRACT

A re-usable, shed-resistant roller cover for use with paint and other heavy liquids is provided. This roller cover includes a non-woven, woven, or knit surface material adapted to be used with paint rollers, wherein the surface material is substantially free of texture, and wherein the surface material further includes a plurality of fibers, wherein the plurality of fibers further comprise natural fibers, synthetic fibers, or a combination thereof; and wherein the plurality of fibers have been interconnected with one another by mechanical means, chemical means, thermal means, solvent means, sonic means, or combinations thereof.

15 Claims, No Drawings

COVERS FOR PAINT ROLLERS

CROSS-REFERENCE TO RELATED APPLICATIONS

This patent application is a continuation-in-part of U.S. application Ser. No. 11/151,166, filed on Jun. 10, 2005 and entitled "Non-Woven Paint Roller Covers" which claimed the benefit of U.S. Provisional Patent Application Ser. No. 60/639,830 filed on Dec. 28, 2004 and entitled "Non-Woven Paint Roller Covers", the disclosures of which are incorporated by reference as if fully rewritten herein.

BACKGROUND OF THE INVENTION

The present invention relates in general to painting implements useful for the application of paints, stains, solvents and other priming or finishing liquids, and more particularly to roller covers for use with paint rollers and the like, wherein the roller covers partially or wholly comprise non-woven materials. The roller covers of this invention are useful for painting a variety of surfaces, including walls, ceilings, and floors of various compositions and textures. These roller covers also exhibit certain desirable characteristics, such as the ability to absorb or otherwise capture the paint or other material to be applied from a reservoir of liquid (typically a roller tray), the ability to retain suitable amounts of such material as the roller is moved from such reservoir to a point near the surface to be painted or otherwise coated, and the ability to release the material being applied as the roller rotates while in contact with surface to be coated.

Commercially available paint roller covers are typically designed for attachment to a substantially cylindrical rotating cage or frame and are usually manufactured in predetermined sizes and lengths. Furthermore, the material from which the roller cover is constructed is often impervious to the liquids to be applied and can usually be cleaned after a single use so that at least one re-use of the roller cover is possible. Roller cover material is typically manufactured in varying densities and thickness, i.e., pile, so as to be suitable for the specific fluid characteristics of the paint or other material being used and for the nature of the surface to be coated or otherwise treated. For obvious reasons, any tendency of roller cover material to shed or deposit, during application, small fibers or threads from the exterior portion of the paint roller onto the surface being coated is highly undesirable.

Prior art paint rollers are usually made of one or more knitted fabrics that are constructed by twisting thousands of fibers into strands that are then knitted or otherwise attached to a backing material. Certain other roller covers are made from woven materials fabricated on looms and then attached to a backing layer of one type or another. Both knitted and woven fabrics have the tendency to shed to varying degrees depending on the depth and density of the fabric, the characteristics of the coating material being applied, and the character of the surface being coated. Moreover, the manufacture of knitted and woven materials is often labor-intensive, thereby resulting in higher overall costs and reduced profitability. Thus, the composition of roller covers and the methods of manufacture associated therewith, both impact the ability to make quality roller covers at affordable prices. Ideally, paint roller covers are inexpensive and reusable so as to be accessible either by the professional or the layperson using such products. Thus, there is a need for an alternate roller cover material that does not shed, that can be used to make roller covers quickly and inexpensively, and that meets other predetermined or pre-identified quality criteria and characteristics.

SUMMARY OF THE INVENTION

The following provides a summary of certain exemplary embodiments of the present invention. This summary is not an extensive overview and is not intended to identify key or critical aspects or elements of the present invention or to delineate its scope. Deficiencies in and of the prior art are overcome by the present invention, the exemplary embodiments of which provide inexpensive, re-usable, shed-resistant roller covers for use with paint and other heavy liquids. Essentially, this invention is directed to a roller cover that utilizes and incorporates non-woven materials into certain functional and structural aspects of the roller cover, i.e., the exterior covering and/or the core material to which the exterior covering is attached. The present invention includes at least five exemplary embodiments of non-woven roller covers.

A first general embodiment comprises a single outer surface, layer, ply, or web of non-woven, woven, or knit material that replaces the fabrics utilized by other roller covers. This embodiment includes an optional substrate material or backing material to which the non-woven material is bound and a rigid core comprising non-woven material or other material. The stable substrate provides a degree of dimensional stability to the roller cover and prevents or reduces "necking" that can result in the formation of gaps on the roller core. The rigid core provides structural support to the roller cover. In this and other embodiments, the non-woven roller cover material may be spirally wrapped onto the core using known roller construction technology. A second general embodiment comprises an outer layer of sliver knitted or woven material, a substrate to which the knit or woven material is bound, and a core to which the substrate is bound. In this embodiment, the core comprises non-woven material and is flexible, semi-rigid, or rigid in consistency. A third general embodiment comprises at least two outer layers or plies of non-woven material, which may be the same or different non-woven materials and which may be attached to one another by chemical, mechanical, or other means. This embodiment includes an optional substrate material to which the non-woven composite is bound and a core comprising non-woven material or other material. A fourth general embodiment comprises a single or multi-ply knitted, woven, or non-woven flexible and collapsible sleeve and does not include a substrate or core. A fifth general embodiment comprises a single or multi-ply knitted, woven, or non-woven flexible and collapsible sleeve adapted for use with a roller cage or frame that includes an optional core integrated with the roller cage or frame.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the associated descriptions are to be regarded as illustrative and not restrictive in nature.

DETAILED DESCRIPTION OF THE INVENTION

Exemplary embodiments of the present invention are now described and although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention. In the exemplary embodiments described herein, the roller covers of the present invention are substantially cylindrical in shape and are intended for use with standard paint rollers and frames. This characteristic should not be construed in a limiting sense because non-woven materials may be incorporated into painting implements having other configurations and geometries. The non-woven roller covers contemplated by this invention typically include an even or "homogeneous" surface that is substantially free of texture, i.e., the surface of the roller cover does not necessarily include a pre-determined three-dimensional pattern or any other surface characteristic which might create a visible image or geometric texture on the surface being treated.

With respect to this invention, the term "non-woven" refers to a sheet, matrix, or web of fabric or material that is created by bonding and/or interlocking fibers, yarns, or filaments using mechanical, thermal, chemical, solvent means, or other means. The term "fiber" is used in its generic sense, and refers to yarns, threads, filaments, and the like, as well as to actual fibers. In various embodiments of the present invention, the non-woven web includes or may include multiple blends of natural and/or synthetic fiber or filaments including, but not limited to, single component or bi-component fibers, filaments or yarns of varying weight, cross section or thickness, density, elongation, tensile strength, shrinkage, air permeability, Taber abrasion, denier, staple length, structure, and melt characteristics. The term "denier" refers to the weight in grams of 9,000 meters of a filament or yarn. "Staple length" refers to fiber/filament cut length. In one or more exemplary embodiments of this invention, the non-woven material includes a denier of about 0.8 to 40; a cut length from about 0.2 inches to 7.5 inches plus continuous filament; a tenacity of about 1.0 to 7.5 grams/denier, an elongation of about 10% to 125%; a heat set temperature of about 0° C. to 200° C.; and a shrinkage of about 0% to 10%. Other ranges and values are possible and will be determined by the particular combination of fibers used to create non-woven materials that are intended for different applications.

In all embodiments of the present invention, the various non-woven fabrics or webs include or may include multiple blends of natural and/or synthetic fiber or filaments including, but not limited to, single component or bi-component fibers, filaments or yarns of various cross sections, deniers, staple lengths, structure, and melt characteristics. The fiber or filaments may be of natural origin or they may be any of the synthetic fibers The natural fibers that are compatible with present invention include: wool, cotton, flax, and silk fibers and combinations thereof. The synthetic fibers that are compatible with the present invention include: polyester (polyethylene terepthalate), polypropylene, polyethylene, nylon (polyamide), acrylic, modacrylic, rayon, acetate, PCT, PETG, and combinations thereof. In certain embodiments, a heat-set fiber or a "binder" fiber is incorporated into the fiber web. This binder fiber acts as an inter-fiber adhesive because the softening point of the binder fiber is typically less than the other fibers it is blended with. Therefore, including binder fibers in a non-woven blend results in a more uniform bonded structure when the non-woven material is exposed to a low temperature by fusing the binder fiber with the adjacent synthetic or natural fibers. The inclusion of a binder fiber also holds or stabilizes the pile of the roller cover and reduces shrinkage of the roller cover during the assembly process.

In embodiments of the present invention that include a substrate in the form of a stable backing material, the substrate may include individually or in combination: paper, phenolic impregnated paper, olefin sheets, urethane foams, fabric or cloth, metallic(s), elastomer(s), non-woven or similar materials. Other materials are possible. The cover materials may be bonded to the substrate by mechanical, chemical, or other means including, but not limited to, resin bonding, saturation print, spray, foam (polyester, polyether, etc.), powder bonding, fusion, thermal, sonic, air, calender, or spun lace (hydro-entanglement), or combinations thereof.

In embodiments wherein the cover material, either with or without a substrate is attached to a tubular core, the core may include, but is not limited to, the following materials: non-woven materials, fabric, wood; paper; impregnated phenolic resin paper; silica; metal (and similar materials); paper/olefin composites; olefin sheets; polyolefin sheets; extruded plastic such as polypropylene, polyethylene, PET, PVC, TPR, TPE, nylon, glass filled nylon, and acetal; plastic ribbon/sheet, such as polypropylene, polyethylene, PET, PVC, TPR, TPE, nylon, glass filled nylon, and acetal. The cover material with or without a substrate may be bonded to the core materials with, but not limited to, the following materials: adhesives, such as epoxy, urethanes, cyanoacrylates, hot melts, and solvents; thermoplastic resins, such as polypropylene, polyethylene, TPR, TPE, PET, PVC, nylon, and acetal; powder bonding; thermal fusion; radio waves, UV, ultrasound, and microwaves; mechanical bonding; and chemical fusion.

Having generally described this invention, a further understanding can be obtained by reference to certain specific examples detailed below, which are provided for purposes of illustration only and are not intended to be all inclusive or limiting unless otherwise specified.

The first general embodiment of this invention comprises a single outer layer or ply of non-woven material that replaces the knitted or woven fabrics utilized by other roller covers. This embodiment includes an optional substrate material to which the non-woven material is bound and a core comprising non-woven material or other material. The single outer layer comprises a substantially continuous web of non-woven material that may or may not include a stable substrate, i.e., backing material as part of the roller cover. Inclusion of a stable substrate provides a degree of dimensional stability to the roller cover and prevents or reduces "necking" which can result in the formation of gaps on the roller core. This non-woven web is typically manufactured to be slit or cut into appropriate configurations that can be effectively incorporated into a paint roller. The non-woven web may be spirally wrapped using known roller construction technology (see below).

With regard to exemplary fibers that are compatible with the cover component of this embodiment, such fibers may include blends of natural and synthetic fibers produced from renewable or non-renewable sources including, but not limited to the following: polyesters, polypropylene, polyethylene, nylon (polyamide), acrylic, modacrylic, acetate, PCT, PETG, biodegradable polyesters, biodegradable polymer fibers, starch based biodegradable polymer fibers, microfiber, PTT fiber, PLA fiber, recycled polyester (post industrial, post consumer or combinations thereof), cotton, recycled cotton, cellulose fiber, regenerated cellulose (e.g., Rayon, Lyocell), wool, flax, silk, bamboo, bast fibers, kenaf, bagasse, elastoester, elasterelle-P, PTAT (polytetramethylene adipate-co-terephthalate; a biodegradable elastic polyester), spandex, elastan, elastomeric fiber, filaments, or yarns (including binder fiber and splittable bi-component segmented fibers), and combinations thereof.

The optional substrate component is typically provided in the form of a stable backing material and may include: paper, phenolic impregnated paper, olefin sheets, urethane foams, fabric or cloth, metallic(s), elastomer(s), non-woven materials, or combinations thereof. Other materials are possible. The non-woven material may be attached or bonded to the substrate by mechanical means, chemical means, thermal means, solvent means, sonic means, or other more specific means including, but not limited to, resin bonding, saturation print, spray, foam (e.g., polyester, polyether), powder bonding, fusion, air, calender, spun lace (hydro-entanglement), or combinations thereof.

The core component may include, but is not limited to, the following materials: non-woven materials, fabric, wood; paper; impregnated phenolic resin paper; silica; metal (and similar materials); paper/olefin composites; olefin sheets; polyolefin sheets; extruded plastic such as polypropylene, polyethylene, polyethylenetelephthalate (PET), polyvinyl chloride (PVC), thermoplastic rubber (TPR), thermoplastic elastomer (TPE), nylon, glass filled nylon, and acetal; plastic ribbon/sheet, such as polypropylene, polyethylene, PET, PVC, TPR, TPE, nylon, glass filled nylon, and acetal. The non-woven material may be attached or bonded to the core by mechanical means, chemical means, thermal means, solvent means, adhesive means, sonic means, or other more specific means that include the use of epoxy, urethanes, cyanoacrylates, hot melts, thermoplastic resins (such as polypropylene, polyethylene, TPR, TPE, PET, PVC, nylon, and acetal), powder bonding, radio waves, UV, ultrasound, and microwaves.

A first specific example of this first general embodiment provides a blend that comprises 90% 7-denier PET in a 76 mm staple length and 10% T-110 binder fiber. This blend is about 12 ounces per square yard and is typically gray in color. A second specific example of this general embodiment of the non-woven material of the present invention provides a blend that comprises 90% 9-denier PET (high heat set and high crimp) in a 76 mm staple length and 10% T-110 binder fiber. This blend is about 12 ounces per square yard and is typically white in color. A third specific example of this first general embodiment of the non-woven material of the present invention provides a blend that comprises 45% 4.75-denier PET (high heat set and high crimp) in a 76 mm staple length; 45% 6.70-denier PET (high heat set and high crimp) in a 76 mm staple length, 10% T-110 binder fiber. This blend is typically white in color. All three of these exemplary blends may be fabricated in pile heights of 3 mm, 5 mm, or 7 mm. Other pile heights are possible.

A second general embodiment of this invention comprises an outer layer of sliver knit, woven, or other material, a substrate or backing to which the knit or woven material is bound or otherwise attached, and a core (which may also be referred to as a "sleeve") to which the substrate is bound or otherwise attached. In this embodiment, the core comprises non-woven material and is flexible, semi-rigid, or rigid in consistency. The non-woven material that comprises the core in this embodiment may be provided in spools or a similar ribbon-like form and is compatible with existing assembly and manufacturing technologies used for creating roller covers. The thickness, composition, and certain other characteristics of the material selected for the non-woven core will typically determine the relative flexibility or rigidity of the roller cover. The core sleeve may be tubular or cylindrical, single or multiple ply construction.

With regard to exemplary fibers that are compatible with this cover component of this embodiment, such fibers may include blends of natural and synthetic fibers produced from renewable or non-renewable sources including, but not limited to the following: polyesters, polypropylene, polyethylene, nylon (polyamide), acrylic, modacrylic, acetate, PCT, PETG, biodegradable polyesters, biodegradable polymer fibers, starch based biodegradable polymer fibers, microfiber, PTT fiber, PLA fiber, recycled polyester (post industrial, post consumer or combinations thereof), cotton, recycled cotton, cellulose fiber, regenerated cellulose (e.g., Rayon, Lyocell), wool, flax, silk, bamboo, bast fibers, kenaf, bagasse, elastoester, elasterelle-P, PTAT (polytetramethylene adipate-co-terephthalate; a biodegradable elastic polyester), spandex, elastan, elastomeric fiber, filaments, or yarns (including binder fiber and splittable bi-component segmented fibers), and combinations thereof. The nonwoven material including fabric, fiber, filaments, yarns, or backing yarns may be coated or compounded with an infrared absorbing additive, pigment, ink, dye, or photoinitiators including carbon black.

The substrate component is typically provided in the form of a stable backing material and may include: paper, phenolic impregnated paper, olefin sheets, urethane foams, fabric or cloth, metallic(s), elastomer(s), non-woven materials, or combinations thereof. Other materials are possible. The non-woven material may be attached or bonded to the substrate by mechanical means, chemical means, thermal means, solvent means, sonic means, or other more specific means including, but not limited to, resin bonding, saturation print, spray, foam (e.g., polyester, polyether), powder bonding, fusion, air, calender, spun lace (hydro-entanglement), or combinations thereof.

With regard to nonwoven cores, thermoplastic, thermoset, and biodegradable materials are all compatible with the present invention. The exemplary cores used with this embodiment are typically manufactured using either spunbond, meltblown, spunlace (hydroentangeled), airlaid, wetlaid, highloft (crosslapped), needle punch, or spinlace techniques, or combinations thereof.

With regard to bonding, the outer layer of sliver knit fabric, woven fabric, nonwoven, or other material may be attached or bonded to the core (sleeve) by mechanical means, adhesive means, sonic means, light means, or other specific means that include, but are not limited to, the use of the following: adhesives, epoxies, urethanes, cyanoacrylates, hot melts, reactive hot melts, thermoplastic resins (e.g., polypropylene, polyethylene, polyethylenephthalate (PET), thermoplastic elastomer (TPE), thermoplastic rubber (TPR), polyvinyl chloride (PVC), nylon, and acetal), flexible adhesives (including but not limited to elastomers), biodegradable polymers, biodegradable adhesives, starch based biodegradable polymers and adhesives, light activated adhesives, print bonding, electromagnetic wavelength, powder bonding, radio waves, UV, ultra sound, microwaves, saturation, and spray.

A first specific example of this second general embodiment provides a blend that comprises a core including a 2-ply thermoplastic nonwoven material; 1-ply spunbond polyester ($100 \text{ g/m}^2$); 1-ply spunbond polyester ($250 \text{ g/m}^2$); a polypropylene adhesive; and a sliver knit fabric. A second specific example of this second general embodiment provides a blend that comprises a core including a 2-ply thermoplastic nonwoven material; 1-ply spunbond polyester ($180 \text{ g/m}^2$); 1-ply spunbond polyester ($250 \text{ g/m}^2$); polypropylene adhesive; and a sliver knit fabric. A third specific example of this second general embodiment provides a blend that comprises a core including a 2-ply thermoplastic nonwoven material; 1-ply spunbond polyester ($250 \text{ g/m}^2$); 1-ply spunbond polyester ($250 \text{ g/m}^2$); a polypropylene adhesive; and a sliver knit fabric. A fourth specific example of this second general embodiment provides a blend that comprises a core including a core including a 2-ply thermoset nonwoven material; 1-ply wet laid nonwoven (160 g/m²); 1-ply wet laid nonwoven (160 g/m²); a polypropylene adhesive; and a sliver knit fabric. A fifth specific example of this second general embodiment provides a blend that comprises a core including a core including a 2-ply thermoset nonwoven material; 1-ply wet laid nonwoven (160 g/m²); 1-ply wet laid nonwoven (102 g/m²); a polypropylene adhesive; and a sliver knit fabric.

A third general embodiment of this invention comprises at least two outer layers or plies of non-woven material, which may be the same or different non-woven materials and which may be attached to one another by mechanical means, chemical, means adhesive means, sonic means, light means, or other means. This embodiment includes an optional substrate material to which the non-woven multi-web or composite is bound and a core comprising non-woven material or other material. In this embodiment, the various layers of non-woven material may be selected based on expected or desired results, e.g., desired overall surface texture, or specific uses or applications, e.g., organic solvents vs. paint.

With regard to exemplary fibers that are compatible with the cover component of this embodiment, such fibers may include blends of natural and synthetic fibers produced from renewable or non-renewable sources including, but not limited to the following: polyesters, polypropylene, polyethylene, nylon (polyamide), acrylic, modacrylic, acetate, PCT, PETG, biodegradable polyesters, biodegradable polymer fibers, starch based biodegradable polymer fibers, microfiber, PTT fiber, PLA fiber, recycled polyester (post industrial, post consumer or combinations thereof), cotton, recycled cotton, cellulose fiber, regenerated cellulose (e.g., Rayon, Lyocell), wool, flax, silk, bamboo, bast fibers, kenaf, bagasse, elastoester, elasterelle-P, PTAT (polytetramethylene adipate-co-terephthalate; a biodegradable elastic polyester), spandex, elastan, elastomeric fiber, filaments, or yarns (including binder fiber and splittable bi-component segmented fibers), and combinations thereof. The nonwoven material including fabric, fiber, filaments, yarns, or backing yarns may be coated or compounded with an infrared absorbing additive, pigment, ink, dye, or photoinitiators including carbon black.

The optional substrate component is typically provided in the form of a stable backing material and may include: paper, phenolic impregnated paper, olefin sheets, urethane foams, fabric or cloth, metallic(s), elastomer(s), non-woven materials, or combinations thereof. Other materials are possible. The non-woven material may be attached or bonded to the substrate by mechanical means, chemical means, thermal means, solvent means, sonic means, or other more specific means including, but not limited to, resin bonding, saturation print, spray, foam (e.g., polyester, polyether), powder bonding, fusion, air, calender, spun lace (hydro-entanglement), or combinations thereof.

With regard to nonwoven cores, thermoplastic, thermoset, and biodegradable materials are all compatible with the present invention. The exemplary cores included with this embodiment are typically manufactured using spunbond, meltblown, spunlace (hydroentangeled), airlaid, wetlaid, highloft (crosslapped), needle punch, or spinlace techniques, or combinations thereof.

With regard to bonding, the core (sleeve) consists of at least two outer layers or plies of nonwoven material (which may be the same or different nonwoven materials) which may be attached or bonded to one another by mechanical means, adhesive means, sonic means, light means, or other specific means that include but not limited to the use of the following: adhesives, epoxies, urethanes, cyanoacrylates, hot melts, reactive hot melts, thermoplastic resins (e.g., polypropylene, polyethylene, polyethylenephthalate (PET), thermoplastic elastomer (TPE), thermoplastic rubber (TPR), polyvinyl chloride (PVC), nylon, and acetal), flexible adhesives (including but not limited to elastomers), biodegradable polymers, biodegradable adhesives, starch based biodegradable polymers and adhesives, light activated adhesives, print bonding, electromagnetic wavelength, powder bonding, radio waves, UV, ultra sound, microwaves, saturation, and spray.

A specific example of this third general embodiment provides a blend that comprises a nonwoven composite that includes a layer or ply of highloft polypropylene and a layer or ply of spunbond polypropylene which is bonded to a polypropylene sheet or ribbon with polypropylene adhesive.

As stated, the fourth general embodiment of this invention comprises a single or multi-ply knitted, woven, or non-woven flexible (elastic) or semi-flexible (elastic) sleeve and does not include a rigid or semi-rigid substrate or core. Typically, this sleeve is tubular or substantially cylindrical in shape and is compatible with standard rollers. Advantageously, certain embodiments of this sleeve are collapsible and may be shipped or stocked in a collapsed form for conserving shelf or carton space.

With regard to knitted fabrics, the following exemplary knitted fabrics are compatible with sleeve component of the present invention: sliver knit fabric, weft (circular) knitted fabric, warp knitted fabric (tricot or raschel), fiberlock knitted fabric, single knitted fabric (plain jersey; single jersey fabric); knit (tuck (pique); single pique fabric); flat jaquard (single knit jacquard); terry (terry velour fabric); fleeces (napped or not napped); weft inserted warp knit fabric. With regard to woven fabrics, the following exemplary woven fabrics are compatible with the present invention: woven fabric (scrim) and woven velvet fabric (pile).

With regard to exemplary fibers that are compatible with this embodiment, such fibers may include blends of natural and synthetic fibers produced from renewable or non-renewable sources including, but not limited to the following: polyesters, polypropylene, polyethylene, nylon (polyamide), acrylic, modacrylic, acetate, PCT, PETG, biodegradable polyesters, biodegradable polymer fibers, starch based biodegradable polymer fibers, microfiber, PTT fiber, PLA fiber, recycled polyester (post industrial, post consumer or combinations thereof), cotton, recycled cotton, cellulose fiber, regenerated cellulose (e.g., Rayon, Lyocell), wool, flax, silk, bamboo, bast fibers, kenaf, bagasse, elastoester, elasterelle-P, PTAT (polytetramethylene adipate-co-terephthalate; a biodegradable elastic polyester), spandex, elastan, elastomeric fiber, filaments, or yarns (including binder fiber and splittable bi-component segmented fibers), and combinations thereof. The nonwoven material including fabric, fiber, filaments, yarns, or backing yarns may be coated or compounded with an infrared absorbing additive, pigment, ink, dye, or photoinitiators including carbon black.

As stated, the fifth general embodiment of this invention comprises a single or multi-ply knitted, woven, or non-woven flexible and collapsible sleeve adapted for use with a roller cage or frame that includes a core integrated with the roller cage or frame. In this embodiment the flexible sleeve is mounted on or otherwise attached to a substantially cylindrical core component which is formed integrally with the frame component of the paint roller. The sleeve itself includes a nonwoven material that is mechanically needle punched to a sliver knit fabric, woven fabric, or nonwoven material utilizing a tubular nonwoven needle machine. The sleeve nonwoven material may be ultrasonically bonded to a sliver knit fabric, woven fabric, or nonwoven material utilizing a ultra-sonic tube former. The sleeve may also include a knitted sock that has been created using a circular knitting machine.

With regard to exemplary fibers that are compatible with this embodiment, such fibers may include blends of natural and synthetic fibers produced from renewable or non-renewable sources including, but not limited to the following: polyesters, polypropylene, polyethylene, nylon (polyamide), acrylic, modacrylic, acetate, PCT, PETG, biodegradable polyesters, biodegradable polymer fibers, starch based biodegradable polymer fibers, microfiber, PTT fiber, PLA fiber, recycled polyester (post industrial, post consumer or combinations thereof), cotton, recycled cotton, cellulose fiber, regenerated cellulose (e.g., Rayon, Lyocell), wool, flax, silk, bamboo, bast fibers, kenaf, bagasse, elastoester, elasterelle-P, PTAT (polytetramethylene adipate-co-terephthalate; a biodegradable elastic polyester), spandex, elastan, elastomeric fiber, filaments, or yarns (including binder fiber and splittable bi-component segmented fibers), and combinations thereof.

A variety of known roller cover manufacturing techniques and processes are compatible with the roller covers of the present invention. Manufacturing non-woven materials may be accomplished with the processes disclosed in U.S. Pat. Nos. 6,159,134 and 5,572,790 (both issued to Sekar). U.S. Pat. Nos. 6,159,134 and 5,572,790 are hereby incorporated by reference, in their entirety, into this disclosure. In the embodiments of the present invention that include solid cores, the methods and devices disclosed in U.S. Pat. No. 6,231,711 issued to Roberts et al., U.S. Pat. No. 6,199,279 issued to Humphrey et al., and U.S. Pat. No. 5,537,745 issued to Musch et al. (all assigned to the Wooster Brush Company), may be utilized in part or in whole to construct the roller covers. U.S. Pat. Nos. 6,231,711 6,199,279 and 5,537,745 are incorporated by reference, herein, in their entirety.

In each of the embodiments disclosed herein, the web or webs of non-woven material that are incorporated into or comprise the roller cover can be manufactured using one or more known process technologies. Such process technologies include (i) web formation systems such as dry lay, wet lay, air lay (rando web), cross lapping, carding, random carding; (ii) resin to web systems such as spun-bond, and melt blown, and (iii) spun lace hydro-entanglement. Web consolidation determines the characteristics of the non-woven fabric and such consolidation is achievable by friction bonding resulting from a needling operation. Presumably, finishing of the non-woven fabric or fabrics used in the various embodiments of the present invention creates the final desired characteristics of such non-woven fabric.

Another exemplary process useful for manufacturing the non-woven materials of the present invention is referred to as a "needle punch" process. The needle-punch process typically uses barbed needles to transport fiber in a fiber mat or web from the horizontal to the "Z" direction, causing fiber entanglement or fiber interlocking. This process includes the use of a series of machines, the operation of which is coordinated to provide a continuous processing of one or more fiber types into a finished fabric. The series of machines typically includes: feeders, openers, a card, a crosslapper, needle looms, edge slitters, and a winder.

The needle punch process begins with the feeders and the openers, which are designed to regulate the flow of fiber into the system. Fiber clumps are reduced in size to enhance consistency of flow, and bundles of crimped fiber are 'opened' to expose as many individual fibers to the carding process. Fiber finish, which is a processing aid in the form of a liquid overspray, may be applied during these initial stages of preparing the fibers. Fiber input is electronically metered throughout this stage, to enhance weight consistency at the beginning of the web forming, i.e., carding, step. The prepared fibers are then transferred to the card, which includes a number of rotating rolls that are covered with saw-toothed wire and set very close together. The fiber passes through the rolls and alternates between points where either combing or transferring takes place. This series of combing and transferring steps, creates a continuous, uniform web of fibers that weighs about one ounce per square yard and that is uniform in width and appearance. This web of fibers is then removed from the card and transferred to the crosslapper.

The crosslapper is a series of carrying aprons that receives the carded non-woven web and delivers it to the needling process in a series of layers. These layers or 'laps' of fabric are built up on a continuously moving floor apron, set at right angles to the lapper. The weight and width of the fabric can be varied by adjusting the speed of the floor apron, and width of the laydown. The ability to control weight and width at the crosslapper, gives each needling line the flexibility to run many fabric constructions.

The needling step begins when the layered fabric is transferred to the first needle loom, which is called a tacker or preneedler. Multiple needle looms are frequently included in an assembly line and the number and type of looms determines the needling capabilities of each line. The fabric is passed through each loom at a precisely controlled speed by two pair of rollers called, input and output rolls. Inside each loom, the needles are mounted in plates that are bolted to a beam that moves up and down at high rate of speed to permit the needles to 'punch' the fabric. Two plates, the stripper plate and bed plate, which are drilled to match the needle pattern, hold the fabric as it passes through and permit control of the depth of needle penetration. Most looms perform conventional needling using needles referred to a "felting" needles. However, in some lines, the last loom contains "fork" needles that create a pile structure on the fabric surface. Instead of a bed plate, these looms typically use a slotted lamella plate (velour), or a moving brush bed (stratos). At the completion of the needling process, the non-woven fabric is slit to the finished width, wound into rolls, and packaged for delivery. Some assembly lines include a "hot can" device. Prior to slitting and winding, the fabric is exposed to the surface of the can, and the temperature is controlled to provide the desired amount of densification and/or fusing of the back surface of the fabric.

Use of the non-woven paint roller covers of the present invention include the following advantages: (i) the use of non-woven materials and process technologies offers significant cost savings in the manufacture of shed-resistant paint rollers due to high speed manufacturing capability, high output, no knitting or weaving requirement, and ease of recycling; (ii) the use of non-woven process technology allows for a wider selection and end use of fibers and/or filaments that are not typically compatible with knitted and woven industrial pile fabric formulations; (iii) the use of non-woven materials offers versatility in that the non-woven materials can be easily formulated and blended using various fiber combinations to enhance the performance of a roller cover for a wide range of coating applications, including the use of solvents, glues, adhesives, and epoxies; (iv) the use of non-woven process technology allows for the integration of multiple non-woven materials and processes to be used in the manufacture of a paint roller cover; and (v) non-woven materials may be easily color-coded to correspond to specific materials and applications. Additionally, the use of non-woven fabrics or materials allows for the creation of roller covers that are as effective as woven roller covers, but at a significantly lower pile height and density. For painting applications, certain non-woven materials are known to exhibit a 65% release rate (of paint), as compared to a 45% release rate for woven materials.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A roller cover for use with paints and other materials, comprising:
   (a) a surface material; wherein the surface material is substantially free of texture and is adapted to be mounted on a paint roller; wherein the surface material further includes a first fabric and a second fabric; wherein the first fabric is selected from the group consisting of non-woven materials; wherein the second fabric is selected from the group consisting of woven fabrics, knit fabrics, and combinations thereof; and wherein the non-woven materials, woven fabrics, and knit fabrics further include:
      (i) a plurality of fibers, wherein the plurality of fibers further include natural fibers, synthetic fibers, or a combination thereof; and
      (ii) wherein the plurality of fibers have been interconnected with one another by mechanical means, chemical means, thermal means, solvent means, sonic means, or combinations thereof; and
   (b) a substrate to which the surface material is attached, wherein the substrate consists of paper, phenolic impregnated paper, olefin sheets, fabric, metallics, elastomers, non-woven materials, or combinations thereof; and
   (c) a core to which the either the surface material or substrate is attached, wherein the core further includes non-woven materials, fabric, wood, paper, impregnated phenolic resin paper, silica, metal, paper/olefin composites, olefin sheets, polyolefin sheets, polypropylene, polyethylene, polyethylenetelephthalate, polyvinyl chloride, thermoplastic rubber, thermoplastic elastomer, nylon, glass filled nylon, acetal, or combinations thereof; and wherein the core is manufactured by spunbond, meltblown, spunlace, airlaid, wetlaid, highloft, needle punch, or spinlace techniques, or combinations thereof.

2. The roller cover of claim 1, wherein the plurality of fibers further comprises: polyesters, polypropylene, polyethylene, nylon, acrylic, modacrylic, acetate, polycyclohexylenedimethylene terephthalate, polyethylene terephthalate, biodegradable polyesters, biodegradable polymer fibers, starch based biodegradable polymer fibers, microfiber, polytrimethylene terephthalate fiber, polylactide fiber, recycled polyester, cotton, recycled cotton, cellulose fiber, regenerated cellulose, wool, flax, silk, bamboo, bast fibers, kenaf, bagasse, elastoester, elasteralle/polyester, poly(tetramethylene adipate-co-terephthalate), spandex, elastan, elastomeric fiber, filaments, yarns, or combinations thereof.

3. The roller cover of claim 1, wherein the plurality of fibers are coated or compounded with an infrared absorbing additive, a pigment, a ink, a dye, a photoinitiator, or combinations thereof.

4. The roller cover of claim 1, wherein the surface material is attached to the substrate by mechanical means, chemical means, thermal means, solvent means, sonic means or combinations thereof.

5. The roller cover of claim 1, wherein the core further comprises thermoplastic, thermoset, or biodegradable materials.

6. The roller cover of claim 1, wherein the either the surface material or the substrate is attached to the core by mechanical means, adhesive means, sonic means, light means, or combinations thereof.

7. A roller cover for use with paints and other materials, comprising;
   (a) at least one surface material, wherein the surface material is substantially free of texture and further includes a first fabric and a second fabric; wherein the first fabric is selected from the group consisting of non-woven materials; wherein the second fabric is selected from the group consisting of woven fabrics, knit fabrics, and combinations thereof; and wherein the non-woven materials, woven fabrics, and knit fabrics further include:
      (i) a plurality of fibers, wherein the plurality of fibers further include natural fibers, synthetic fibers, or a combination thereof; and
      (ii) wherein the plurality of fibers have been interconnected with one another by mechanical means, chemical means, thermal means, solvent means, sonic means, or combinations thereof; and
   (b) a substrate to which the surface material of the roller cover is attached, wherein the substrate consists of paper, phenolic impregnated paper, olefin sheets, fabric, metallics, elastomers, non-woven materials, or combinations thereof; and
   (c) a core to which either the surface material or the substrate is attached, wherein the core further includes non-woven materials, fabric, wood, paper, impregnated phenolic resin paper, silica, metal, paper/olefin composites, olefin sheets, polyolefin sheets, polypropylene, polyethylene, polyethylenetelephthalate, polyvinyl chloride, thermoplastic rubber, thermoplastic elastomer, nylon, glass filled nylon, acetal, or combinations thereof; and wherein the core is manufactured by spunbond, meltblown, spunlace, airlaid, wetlaid, highloft, needle punch, or spinlace techniques, or combinations thereof.

8. The roller cover of claim 7, wherein the plurality of fibers further comprises: polyesters, polypropylene, polyethylene, nylon, acrylic, modacrylic, acetate, polycyclohexylenedimethylene terephthalate, polyethylene terephthalate, biodegradable polyesters, biodegradable polymer fibers, starch based biodegradable polymer fibers, microfiber, polytrimethylene terephthalate fiber, polylactide fiber, recycled polyester, cotton, recycled cotton, cellulose fiber, regenerated cellulose, wool, flax, silk, bamboo, bast fibers, kenaf, bagasse, elastoester, elasteralle/polyester, poly(tetramethylene adipate-co-terephthalate), spandex, elastan, elastomeric fiber, filaments, yarns, or combinations thereof.

9. The roller cover of claim 7, wherein the plurality of fibers are coated or compounded with an infrared absorbing additive, a pigment, a ink, a dye, a photoinitiator, or combinations thereof.

10. The roller cover of claim 7 wherein the surface material is attached to the substrate by mechanical means, chemical means, thermal means, solvent means, sonic means or combinations thereof.

11. The roller cover of claim 7, wherein the core further comprises thermoplastic, thermoset, or biodegradable materials.

12. The roller cover of claim 7, wherein the substrate is attached to the core by mechanical means, adhesive means, sonic means, light means, or combinations thereof.

13. A roller cover for use with paints and other materials, comprising:
   (a) at least one surface material, wherein the surface material is substantially free of texture and further includes a first fabric and a second fabric; wherein the first fabric is selected from the group consisting of non-woven materials; wherein the second fabric is selected from the group consisting of woven fabrics, knit fabrics, and combinations thereof; and wherein the non-woven materials, woven fabrics, and knit fabrics further include:
      (i) a plurality of fibers, wherein the plurality of fibers further include natural fibers, synthetic fibers, or a combination thereof; and
      (ii) wherein the plurality of fibers have been interconnected with one another by mechanical means, chemical means, thermal means, solvent means, sonic means, or combinations thereof; and
   (b) a substrate to which the non-woven material of the roller cover is attached, wherein the substrate consists of paper, phenolic impregnated paper, olefin sheets, fabric, metallics, elastomers, non-woven materials, or combinations thereof; and wherein the surface material is attached to the substrate by mechanical means, chemical means, thermal means, solvent means, sonic means or combinations thereof; and
   (c) a core to which the substrate is attached, wherein the core further includes non-woven materials, fabric, wood, paper, impregnated phenolic resin paper, silica, metal, paper/olefin composites, olefin sheets, polyolefin sheets, polypropylene, polyethylene, polyethyleneterephthalate, polyvinyl chloride, thermoplastic rubber, thermoplastic elastomer, nylon, glass filled nylon, acetal, or combinations thereof; wherein the core is manufactured by spunbond, meltblown, spunlace, airlaid, wetlaid, highloft, needle punch, or spinlace techniques, or combinations thereof; and wherein the core further comprises thermoplastic, thermoset, or biodegradable materials.

14. The roller cover of claim 13, wherein the plurality of fibers further comprises: polyesters, polypropylene, polyethylene, nylon, acrylic, modacrylic, acetate, polycyclohexylenedimethylene terephthalate, polyethylene terephthalate, biodegradable polyesters, biodegradable polymer fibers, starch based biodegradable polymer fibers, microfiber, polytrimethylene terephthalate fiber, polylactide fiber, recycled polyester, cotton, recycled cotton, cellulose fiber, regenerated cellulose, wool, flax, silk, bamboo, bast fibers, kenaf, bagasse, elastoester, elasteralle/polyester, poly(tetramethylene adipate-co-terephthalate), spandex, elastan, elastomeric fiber, filaments, yarns, or combinations thereof.

15. The roller cover of claim 13, wherein the plurality of fibers are coated or compounded with an infrared absorbing additive, a pigment, a ink, a dye, a photoinitiator, or combinations thereof.

* * * * *